April 19, 1932.   F. W. SPERR, JR   1,854,770
PROCESS FOR DEHYDRATING GAS
Filed July 26, 1926
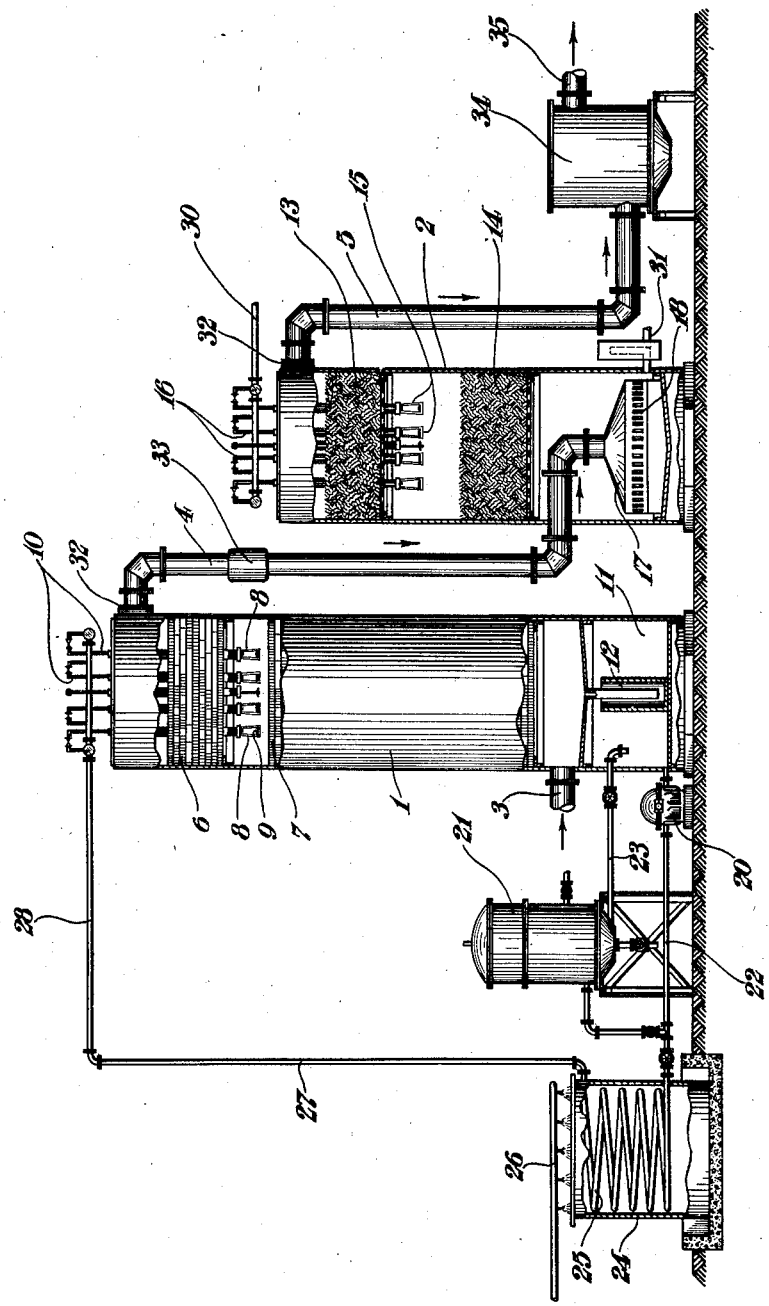
INVENTOR
Frederick W. Sperr Jr.
BY
Jesse P. Langley
ATTORNEY Patented Apr. 19, 1932

1,854,770

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

PROCESS FOR DEHYDRATING GAS

Application filed July 26, 1926. Serial No. 125,003.

My invention relates to processes for dehydrating gas, such, for example, as coke-oven gas, water gas, fuel gases and the like.

One object of my invention is to provide a simple and efficient process for dehydrating gas to a dew-point materially below its temperature.

A second object of my invention is to provide a process of the character described in which the gas may be treated successively with salt and acid solutions.

A further object of my invention is to provide a dehydrating process for gas, in which the dew-point of the gas is successively lowered by solutions having approximately the temperature of the gas.

Dehydrating processes as heretofore provided have consisted in treating the gas with a liquid at a temperature considerably lower than that of the gas whereby the dew-point of the gas was lowered substantially to the temperature of the refrigerated solution. Such processes are not economical by reason of the expense of refrigeration.

In accordance with the present invention, I provide a two-stage process wherein the gas is successively treated by a concentrated salt solution, such, for example, as calcium chloride, and concentrated sulphuric acid. By reason of the fact that the vapor pressures of these solutions are considerably lower than that of water at the same temperatures, the dew-point of the gas is materially lowered by contact with the solutions. This result is secured without materially lowering the temperature of the gas.

My invention will be described in connection with the accompanying drawing, in which the single figure is a partially diagrammatic illustration of apparatus employed in the process constituting my invention.

In practicing my invention, two scrubbing towers 1 and 2, that are connected in series, are employed for dehydrating the gas. Gas passes through the towers successively by means of an inlet pipe 3, a connecting pipe 4 and an outlet pipe 5 for the tower 2.

The tower 1 is provided, in its upper portion, with a section of wooden hurdles 6, which provide a relatively large area of contact surface. The intermediate portion of the tower is provided with a larger section of similar wooden hurdles 7. Between the sections of hurdles 6 and 7 is a group of sprays 8 of stirrup form carrying splatter plates 9. The sprays 8, which may be secured to the bottom of the hurdles 6, are supplied by pipes 10 which are telescopically connected thereto and which extend through the top of the tower and the sections of hurdles 6. The sprays are preferably of the type shown and described in the copending application of C. D. Blackburn, Serial No. 9,932, filed Feb. 18, 1925.

The bottom portion of the tower is provided with a sump 11 for collecting the dehydrating solution and which comprises a liquid seal 12 for the purpose of preventing gas from being drawn into the circulating system for the solution.

The tower 2 comprises an upper section of packing comprising metal turnings 13, which may be of either iron or steel A similar section of turnings 14 is disposed in the central portion of the tower 2 and, as in the tower 1, a group of sprays 15, similar to sprays 8, is disposed between the sections of turnings, the sprays being connected to vertically-extending pipes 16 that extend through the turnings 13 and the top of the tower. A saturator bell 17 that is located in the bottom portion of the tower 2 and is normally immersed in dehydrating solution is connected to the pipe 4 and is provided with serrations or openings 18, through which the gas from the pipe 4 emerges in bubbles when the apparatus is in operation.

The apparatus employed in the first stage of the dehydrating process comprises the tower 1, a recirculating pump 20 that is connected to the sump 11 and an evaporator 21 that is preferably of the continuous type that is connected to the outlet pipe 22 of the pump 20 and, by means of a pipe 23, to the sump 11. A cooler 24, which is here illustrated as of the conventional type, comprising a coil 25 and a water spray 26, is in series with the pump 20 and is connected by pipes 27 and 28 to the pipes 10 for supplying the sprays 8. The dehydrating solution for the first stage is preferably a saturated aqueous solution of calcium chloride.

The apparatus employed in the second stage of the process comprises the tower 2 and a pipe 30 that is connected to a source (not shown) of a suitable supply of sulphuric acid having a concentration of substantially 60° Bé. The diluted solution is withdrawn from the bottom of the tower 2 through a pipe 31 for a purpose to be later described.

The details of my improved process will now be described. It may be assumed that gas saturated with water vapor at 80° F. is being supplied to the inlet pipe 3 of the tower 1. In its passage upwardly through the tower in counter-current to the dehydrating solution, it encounters the hurdles 7 that are covered with the saturated solution of calcium chloride supplied by the sprays 8. By reason of the fact that the vapor pressure of the calcium chloride solution is materially lower than that of water at the same temperature which may be, for example, 80° F., water is absorbed from the gas and the dew-point of the latter is materially lowered without, however, changing its temperature. Gas then passes through the section of hurdles 6, which operate to remove calcium chloride solution that may be carried by the gas.

The calcium chloride solution which has entered the scrubbing tower at approximately 80° F. contains 858 parts of $CaCl_2$ and 1000 parts of water and has a specific gravity of 1.47 (at 20° C.). Theoretically, the gas will be dehydrated to a dew-point of 45° F. by treatment with the calcium chloride solution, since the vapor pressure of a saturated solution of calcium chloride at 80° F. is 7.6 mm. Hg and the vapor pressure of saturated aqueous vapor at 45° F. is 7.6 mm. Hg. However, actual experimental data indicates that, with a solution of calcium chloride at 80° F. having a specific gravity of 1.41 to 1.45, the dew-point of a gas can be reduced to approximately 48 to 50° F.

The gas then passes through a spray baffle 32 at the entrance of the pipe 4 and a spray catcher 33 that operate to remove any calcium chloride spray that has not been removed by the hurdles 6.

The gas then enters the saturator bell 17, which is submerged in the collected solution, and bubbles through the openings 18, whereby considerable moisture is removed from the gas by reason of its contact with relatively concentrated sulphuric acid. The gas passes upwardly through the metal turnings 14, wherein it is further dehydrated, since the turnings are covered with concentrated sulphuric acid supplied by the sprays 15. The gas next engages the relatively dry material in the upper section of turnings 13 to remove practically all of the sulphuric acid entrained in the gas.

The gas then passes out of the tower and through the pipe 5 to a magnesite box 34, where any traces of sulphuric acid are removed by magnesite, which is magnesium carbonate, $MgCO_3$. The reaction is as follows:

$$MgCO_3 + H_2SO_4 = MgSO_4 + CO_2 + H_2O.$$

The magnesite is suitably disposed for intimate contact with the gas. For example, the magnesite may be disposed on one or more foraminous trays in such manner as to permit free circulation of the gas therethrough. The gas then passes from the magnesite box 34 to an outlet pipe 35, through which it may be conveyed to any suitable storage space or distribution system.

The gas which has entered the tower 2 at a dew-point of approximately 50° F. is further dehydrated by its contact with the concentrated sulphuric acid, to a dew-point of 30° F.

In the first stage of the process, the calcium chloride solution is diluted by the water that is absorbed from the gas, and it is, accordingly necessary to remove water therefrom in an amount or at a rate coresponding to that of its absorption in the tower 1. Accordingly, when the recirculating pump 20 withdraws the diluted solution from the bottom of the tower 1, it flows through the pipe 22 and a portion passes through the evaporator 21, where water is removed and the concentrated solution is returned to the sump 11. The evaporation process may be either continuous or intermittent, as desired.

The remainder of the solution passes through the coil 25 of the cooler 24 to reduce the temperature, which has risen by reason of the heat of condensation of the water vapor removed from the gas and by the heat supplied during the evaporation process. The cooled solution, which is at approximately 80° F., then traverses the pipes 27 and 28 to the sprays 8. This process is substantially continuous during the operation of the system.

In the second stage of the process, the sulphuric acid that is supplied to the sprays 15 is preferably at 60° Bé., for the reason that sulphuric acid of this concentration may be safely employed with steel or iron apparatus without the necessity of the latter being lined wtih lead in order to prevent corrosion. When the sulphuric acid is collected at the bottom of the tower, it has a concentration of substantially 55° Bé., by reason of its dilution with the water absorbed in the gas. This degree of concentration is still above the limit at which it may be safely employed without corroding the metallic surfaces with which it may be in contact.

In connection with the usual coke-plant operation, it is not necessary or desirable to remove water from the sulphuric acid for the purpose of restoring its concentration, since the used acid may be employed in connection with the ammonia recovery process which results in the production of ammonium sulphate, as is well known. For example, approximately 25 pounds of 60° Bé. sulphuric acid is used for each ton of coal carbonized in manufacturing ammonium sulphate. On the basis of 11,000 cubic feet of gas per ton of coal carbonized, 24.6 pounds of 60° Bé. acid will be diluted to 55° Bé. in dehydrating this amount of gas from 48° F. to 30° F., which is the dew-point secured in the second stage of my process. Accordingly, the amount of sulphuric acid that is employed in the second stage of the system corresponds very closely with that required for the production of ammonium sulphate, and the two operations may be efficiently and economically combined for the dehdration of coke-oven gas and the manufacture of ammonium sulphate.

The quantities and values specified hereinabove are given by way of example only, and it is to be understood that the process of my invention is not limited thereto. For example, the initial temperatures of the gas and of the saturated solution of calcium chloride may be varied, as desired, in accordance with circumstances, the dew-point of the gas at the end of the first stage being dependent upon the temperatures of the gas and the solution at their entrance to the tower 1.

It will be noted that I have provided a system wherein the gas may be treated safely and successively by a concentrated salt solution and an acid solution. The dew-point of the gas is successively lowered by the two stages without changing the temperature of the gas. By reason of the concentration of the sulphuric acid, it may be employed with steel or iron apparatus without the relatively great expense of lining the latter with lead. In addition, the use of sulphuric acid in dehydrating coke-oven gas is substantially without expense, since the dilute acid may be employed directly in the manufacture of ammonium sulphate.

The arrangement whereby sprays of the detachable connection type are placed below a section of hurdles or packing is particularly advantageous since the connecting pipes may be withdrawn for removal of obstructions without withdrawing the stirrup portions for carrying spatter plates. The foregoing and other advantages will be apparent to those skilled in the art to which my invention appertains.

I claim as my invention:

1. The process of dehydrating coke-oven gas which comprises initially reducing its water content to such amount that the amount of sulphuric acid required to complete its dehydration equals that necessary to convert the ammonia content of a similar quantity of coke-oven gas to ammonium sulphate and then treating said gas with sulphuric acid.

2. The process of dehydrating coke-oven gas which comprises lowering the dew-point of said gas to such temperature that the amount of sulphuric acid required to further dehydrate the gas to 30° F. equals that necessary to convert the ammonia contained in a similar quantity of coke-oven gas to ammonium sulphate and then treating the gas with the required amount of sulphuric acid.

3. The process of dehydrating coke-oven gas which comprises lowering the dew-point of said gas by treating said gas with a solution of relatively low vapor pressure without materially lowering the temperature of said gas and then further dehydrating said gas by treating it with sulphuric acid in an amount that is equal to that required to convert to ammonium sulphate the ammonia contained in a similar quantity of coke-oven gas before being dehydrated.

4. The process of dehydrating coke-oven gas which comprises lowering the dew-point thereof to 48° to 50° F. and then treating it with sulphuric acid at approximately 60° Bé. to further dehydrate the gas to approximately 30° F., the amount of sulphuric acid employed being substantially that necessary to convert to ammonium sulphate the ammonia contained in a similar quantity of coke-oven gas.

5. The process of dehydrating gas which comprises treating said gas with a solution of a hygroscopic salt to materially lower the dew-point of said gas and then treating said gas with sulphuric acid of such concentration that its dilution by the water absorbed from said gas will not render it corrosive to iron or steel.

6. The process of dehydrating gas which comprises treating said gas with a concentrated solution of a hygroscopic salt to remove the major portion of the moisture content of said gas and then treating said gas with concentrated sulphuric acid to remove a relatively minor portion of moisture therefrom whereby its dilution by the moisture absorbed from said gas will not render it corrosive to iron and steel.

7. The process of dehydrating gas which comprises treating said gas with a concentrated solution of a hygroscopic salt to lower the dew-point of said gas to approximately 50° F. and then treating said gas with concentrated sulphuric acid to further lower the dew-point of said gas to approximately 30° F. and which remains noncorrosive to iron and steel by reason of the relatively small amount of moisture absorbed thereby.

In testimony whereof, I have hereunto subscribed my name this 23rd day of July, 1926.

FREDERICK W. SPERR, Jr.